(12) United States Patent
Huck et al.

(10) Patent No.: US 9,217,648 B2
(45) Date of Patent: Dec. 22, 2015

(54) METHOD OF OPERATING A NAVIGATION SYSTEM TO PROVIDE A PEDESTRIAN ROUTE

(75) Inventors: Arnulf F. Huck, Frankfurt (DE); Christian Kalus, Friedrichsdorf (DE); Norbert Thieme, Bad Soden (DE)

(73) Assignee: HERE Global B.V., Veldhoven (NL)

( * ) Notice: Subject to any disclaimer, the term of this patent is extended or adjusted under 35 U.S.C. 154(b) by 699 days.

(21) Appl. No.: 12/749,673

(22) Filed: Mar. 30, 2010

(65) Prior Publication Data

US 2011/0246055 A1    Oct. 6, 2011

(51) Int. Cl.
*G01C 21/36* (2006.01)
*G01C 21/34* (2006.01)

(52) U.S. Cl.
CPC .................. *G01C 21/3453* (2013.01)

(58) Field of Classification Search
None
See application file for complete search history.

(56) References Cited

U.S. PATENT DOCUMENTS

| | | | | |
|---|---|---|---|---|
| 5,959,553 | A * | 9/1999 | Raswant | 340/907 |
| 6,119,065 | A | 9/2000 | Shimada et al. | 701/201 |
| 6,208,934 | B1 | 3/2001 | Bechtolsheim et al. | 701/209 |
| 6,339,746 | B1 | 1/2002 | Sugiyama et al. | 701/209 |
| 6,374,182 | B2 | 4/2002 | Bechtolsheim et al. | 701/209 |
| 6,384,742 | B1 * | 5/2002 | Harrison | 340/944 |
| 6,510,379 | B1 | 1/2003 | Hasegawa et al. | 701/202 |
| 6,542,811 | B2 * | 4/2003 | Doi | 701/533 |
| 6,594,581 | B2 | 7/2003 | Matsuda et al. | 701/211 |
| 6,622,089 | B2 | 9/2003 | Hasegawa et al. | 701/211 |
| 6,922,630 | B2 | 7/2005 | Maruyama et al. | 701/200 |
| 6,957,142 | B2 * | 10/2005 | Entenmann | 701/117 |
| 7,149,533 | B2 * | 12/2006 | Laird et al. | 455/456.3 |
| 7,149,626 | B1 | 12/2006 | DeVries et al. | 701/211 |
| 7,174,153 | B2 * | 2/2007 | Ehlers | 455/404.2 |
| 7,174,154 | B2 * | 2/2007 | Ehlers | 455/404.2 |
| 7,221,928 | B2 * | 5/2007 | Laird et al. | 455/404.1 |
| 7,260,473 | B2 | 8/2007 | Abe et al. | 701/200 |
| 8,013,734 | B2 * | 9/2011 | Saigh et al. | 340/539.13 |
| 8,090,532 | B2 * | 1/2012 | Tashev et al. | 701/433 |
| 8,384,562 | B2 * | 2/2013 | Wall et al. | 340/944 |
| 2002/0077749 | A1 * | 6/2002 | Doi | 701/209 |
| 2005/0075116 | A1 * | 4/2005 | Laird et al. | 455/456.3 |
| 2005/0164673 | A1 * | 7/2005 | Ehlers | 455/404.1 |
| 2005/0216184 | A1 * | 9/2005 | Ehlers | 701/200 |

(Continued)

FOREIGN PATENT DOCUMENTS

DE    102007050021    4/2013
JP    08202982    8/1996

(Continued)

OTHER PUBLICATIONS

European Search Report for Application No. 10193997.3, mailed Jul. 19, 2013.

*Primary Examiner* — Mussa A Shaawat
(74) *Attorney, Agent, or Firm* — Lempia Summerfield Katz LLC

(57) ABSTRACT

A computer implemented method of operating a navigation system to provide a pedestrian route is provided. The method comprises receiving a request for a route from an origin to a destination. The method evaluates a plurality of pedestrian paths by accessing data representing the pedestrian paths to determine a safety cost associated with including the pedestrian path in the route. The safety cost indicates a safety risk for the pedestrian. The method provides the route comprising the pedestrian paths that form a continuous navigable route between the origin and the destination that minimize the safety cost.

20 Claims, 10 Drawing Sheets

(56) References Cited

U.S. PATENT DOCUMENTS

| | | | |
|---|---|---|---|
| 2005/0256885 A1* | 11/2005 | Yairi et al. | 707/100 |
| 2006/0187086 A1* | 8/2006 | Quintos | 340/936 |
| 2007/0012237 A1* | 1/2007 | Nielsen | 116/63 R |
| 2007/0129055 A1* | 6/2007 | Ehlers | 455/404.2 |
| 2007/0138347 A1* | 6/2007 | Ehlers | 246/1 R |
| 2007/0276600 A1* | 11/2007 | King et al. | 701/301 |
| 2008/0284587 A1* | 11/2008 | Saigh et al. | 340/539.13 |
| 2009/0005959 A1* | 1/2009 | Bargman et al. | 701/117 |
| 2009/0063030 A1* | 3/2009 | Howarter et al. | 701/117 |
| 2009/0157302 A1* | 6/2009 | Tashev et al. | 701/206 |
| 2009/0185856 A1* | 7/2009 | Kim | 404/1 |
| 2009/0322566 A1* | 12/2009 | Shirakawa | 340/944 |
| 2010/0123737 A1* | 5/2010 | Williamson et al. | 345/672 |
| 2010/0214129 A1* | 8/2010 | Brualla Marti et al. | 340/944 |
| 2010/0292917 A1* | 11/2010 | Emam et al. | 701/201 |
| 2010/0308982 A1* | 12/2010 | Cooperstock et al. | 340/407.1 |
| 2011/0098910 A1* | 4/2011 | Saarimaki et al. | 701/200 |
| 2011/0130956 A1* | 6/2011 | Tracton et al. | 701/201 |
| 2011/0140919 A1* | 6/2011 | Hara et al. | 340/907 |
| 2011/0144896 A1* | 6/2011 | Howarter et al. | 701/117 |
| 2012/0223843 A1* | 9/2012 | Wall et al. | 340/944 |
| 2013/0049989 A1* | 2/2013 | Howarter et al. | 340/905 |

FOREIGN PATENT DOCUMENTS

| | | |
|---|---|---|
| JP | 2003121191 | 4/2003 |
| JP | 2009294153 | 12/2009 |
| WO | WO2009049579 | 4/2009 |

* cited by examiner

| IDX | Start Node | Target Node | Left Sidewalk | Right Sidewalk | Start Crosswalk | Target Crosswalk | Left Node | Right Node |
|---|---|---|---|---|---|---|---|---|
| 0 | A | B | yes | yes | no | no | C | E |
| 1 | A | D | yes | no | no | no | E | E |
| 2 | B | A | yes | yes | no | no | D | D |
| 3 | B | C | yes | yes | no | no | F | E |
| 4 | B | E | yes | yes | yes | no | F | D |
| 5 | C | B | yes | yes | no | no | E | A |
| 6 | C | F | yes | yes | yes | no | E | E |
| 7 | C | E | no | no | no | no | F | D |
| 8 | D | A | no | no | no | no | B | B |
| 9 | D | E | yes | yes | no | no | B | F |
| 10 | E | D | yes | yes | no | yes | A | A |
| 11 | E | B | yes | no | no | yes | A | C |
| 12 | E | C | no | no | no | no | B | F |
| 13 | F | F | no | yes | no | no | C | C |
| 14 | F | E | yes | yes | no | no | D | B |
| 15 |   | C | yes | yes | no | no | E | B |

METHOD OF OPERATING A NAVIGATION SYSTEM TO PROVIDE A PEDESTRIAN ROUTE

BACKGROUND OF THE INVENTION

The present invention relates to a method and system for operating a navigation system, and more particularly to a method and system for calculating a route from an origin location to a destination location for travel by a pedestrian.

Navigation systems are available that provide end users with various navigation-related functions and features. For example, some navigation systems are able to determine an optimum route to travel along a road network from an origin location to a destination location in a geographic region. Using input from the end user, the navigation system can examine various potential routes between the origin and destination locations to determine the optimum route. The navigation system may then provide the end user with information about the optimum route in the form of guidance that identifies the maneuvers required to be taken by the end user to travel from the origin to the destination location. Some navigation systems are able to show detailed maps on displays outlining the route, the types of maneuvers to be taken at various locations along the route, locations of certain types of features, and so on.

In order to provide these and other navigation-related functions and features, navigation systems use geographic data. The geographic data may be in the form of one or more geographic databases that include data representing physical features in the geographic region. The geographic database includes information about the represented geographic features, such as one-way streets, position of the roads, speed limits along portions of roads, address ranges along the road portions, turn restrictions at intersections of roads, direction restrictions, such as one-way streets, and so on. Additionally, the geographic data may include data representing points of interests, such as businesses, facilities, restaurants, hotels, airports, gas stations, stadiums, police stations, and so on.

Although navigation systems provide many important features, there continues to be room for new features and improvements. One area in which there is room for improvement relates to determining a route for a pedestrian. Pedestrian routes provide challenges not associated with vehicle routes. Pedestrians are not limited to travel only on the road network; rather, pedestrians may walk through public spaces, such as plazas and parks, having no associated road network. Additionally, pedestrians do not have direction restrictions as a vehicle; pedestrians can walk down a one-way street in both directions. Moreover, pedestrians have a greater degree of freedom of motion and may become more frequently confused as to their orientation to destination. Furthermore, pedestrians walking along road networks face a safety risk by interacting with vehicles traveling the road networks.

Accordingly, it would be beneficial to provide improved navigation-related functions and features to pedestrians and other users. More particularly, it would be beneficial to determine an efficient and safe route from an origin location to a destination location for travel by a pedestrian.

SUMMARY OF THE INVENTION

To address these and other objectives, the present invention comprises a method for operating a navigation system to provide a pedestrian route. The method comprises receiving a request for a route from an origin to a destination. The method evaluates a plurality of pedestrian paths by accessing data representing the pedestrian paths to determine a safety cost associated with including the pedestrian path in the route. The safety cost indicates a safety risk for the pedestrian. The method provides the route comprising the pedestrian paths that form a continuous navigable route between the origin and the destination that minimize the safety cost.

According to another aspect of the invention, the present invention comprises a computer implemented method of operating a navigation system to provide a pedestrian route. The method comprises receiving an origin and a destination and determining a plurality of candidate solution routes between the origin and the destination. Each of the candidate solution routes comprises a plurality of sidewalks and crosswalks that form a continuous navigable route between the origin and the destination. The sidewalks are associated with road segments and motor vehicles are prohibited from traveling the sidewalks. The method evaluates the candidate solution routes by accessing data representing the sidewalks and crosswalks from a geographic database to determine a safety cost associated with including the sidewalks and the crosswalks in the candidate solution route. The safety cost indicates a safety risk for the pedestrian. Additionally, the method comprises generating route guidance for the candidate solution route that minimizes the safety cost. The route guidance includes a safety advisory.

According to a further aspect of the invention, the present invention comprises a navigation system that provides a pedestrian route. The navigation system comprises a geographic database, a computer, and a route calculation program executed on the computer. The route calculation program receives an origin and a destination and computes a solution route between the origin and the destination comprising a series of pedestrian paths that form a continuous navigable route between the origin and the destination for travel by a pedestrian. The candidate pedestrian paths for the solution route are evaluated for a pedestrian safety cost and included in the solution route to minimize safety risk.

BRIEF DESCRIPTION OF THE DRAWINGS

An exemplary embodiment of the present invention is described herein with reference to the following drawings.

FIG. 8 shows a pedestrian maneuver table.

DETAILED DESCRIPTION OF THE PRESENTLY PREFERRED EMBODIMENTS

I. Navigation System

Figure 1:
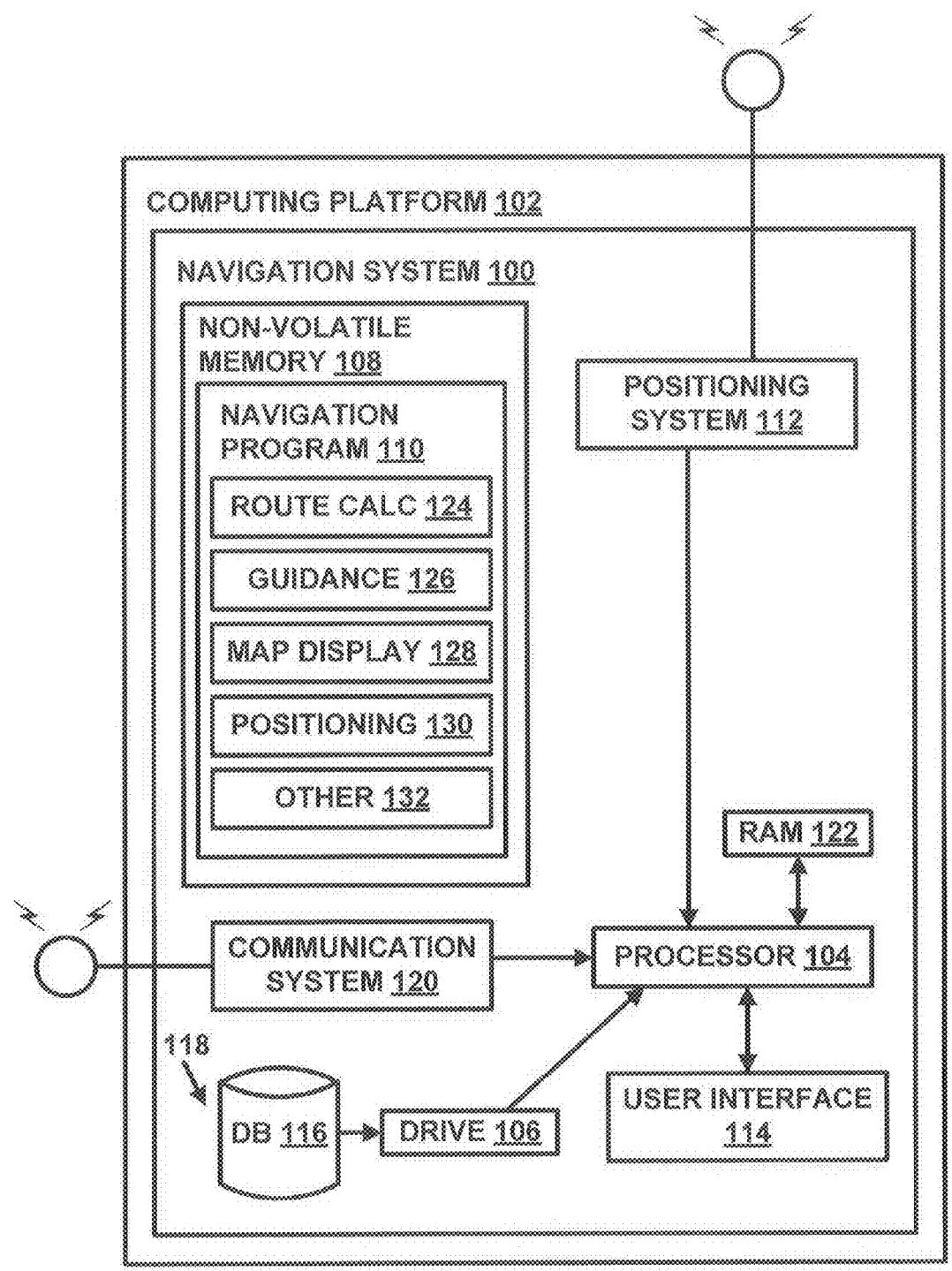
FIG. 1 is a block diagram of a navigation system, according to an exemplary embodiment.

FIG. 1 is a block diagram of a navigation system 100 associated with a computing platform 102, such as a mobile computer, mobile telephone, personal digital assistant (PDA), personal computer, personal navigation device, in-vehicle navigation device or any other computer, according to an exemplary embodiment. The navigation system 100 is a combination of hardware and software components. In one embodiment, the navigation system 100 includes a processor 104, a drive 106 connected to the processor 104, and a non-volatile memory storage device 108 for storing navigation application software programs 110 and possibly other information.

The navigation system 100 also includes a positioning system 112. The positioning system 112 may utilize GPS-type technology, a dead reckoning-type system, or combinations of these or other systems, all of which are known in the art. The positioning system 112 may include suitable sensing devices that measure the traveling distance speed, direction, orientation and so on. The positioning system 112 may also include a GPS system. The positioning system 112 outputs a signal to the processor 104. The navigation application software programs 110 that run on the processor 104 use the signal from the positioning system 112 to determine the location, direction, orientation, etc., of the computing platform 102.

The navigation system 100 also includes a user interface 114 that allows the end user to input information into the navigation system 100 and obtain information from the navigation system 100. The user interface 114 may include a keyboard, microphone, display, speaker or other user interfaces. The input information may include a request for navigation features and functions of the navigation system 100. To provide navigation features and functions, the navigation system 100 uses a geographic database 116 stored on a computer readable storage medium 118. In one embodiment, the storage medium 118 is installed in the drive 106 so that the geographic database 116 can be read and used by the navigation system 100. In one embodiment, the geographic database 116 may be a geographic database published by NAVTEQ North America, LLC of Chicago, Ill. The storage medium 118 and the geographic database 116 do not have to be physically provided at the location of the navigation system 100. In alternative embodiments, the storage medium 118, upon which some or the entire geographic database 116 is stored, may be located remotely from the rest of the navigation system 100 and portions of the geographic data provided via a communications system 120, as needed.

In one exemplary type of system, the navigation application software programs 110 load from the non-volatile memory storage device 108 into a random access memory (RAM) 122 associated with the processor 104. The processor 104 also receives input from the user interface 114. The navigation system 100 uses the geographic database 116 stored on the storage medium 118, possibly in conjunction with the outputs from the positioning system 112 and the communications system 120, to provide various navigation features and functions. The navigation application software programs 110 may include separate applications (or subprograms) that provide the various navigation-related features and functions. The navigation functions and features may include route calculation 124 (wherein a route from an origin to a destination is determined), route guidance 126 (wherein detailed directions are provided for reaching a desired destination), map display 128, and positioning 130 (e.g., map matching). Other functions and programming 132 may be included in the navigation system 100 including people and business finding services (e.g., electronic yellow and white pages), point of interest searching, destination selection, and location base advertising services.

The navigation application software programs 110 may be written in a suitable computer programming language such as C, although other programming languages, such as C++ or Java, are also suitable. All of the components described above may be conventional (or other than conventional) and the manufacture and use of these components are known to those of skill in the art.

In alternative embodiments, the navigation system 100 includes local components, located physically with an end user, that communicate with remote components, located remotely from the end user. In this embodiment, the remote components include a navigation services server. The navigation application software programs 110 and the geographic database 116 reside on the navigation server. The local components of the navigation system communicate with the remote components via a communication link. The communication link may use any suitable technology and/or protocols that are currently available, as well as technology and/or protocols that become available in the future. A portion of the communications link may include a wireless portion that enables two-way communication between the local components and the remote components. The wireless portion may be implemented by any suitable form of wireless communication, including cellular, PCS, satellite, FM, radio, Bluetooth®, other long and short range transmission technologies or technologies that may be developed in the future.

II. Geographic Database

Figure 2:
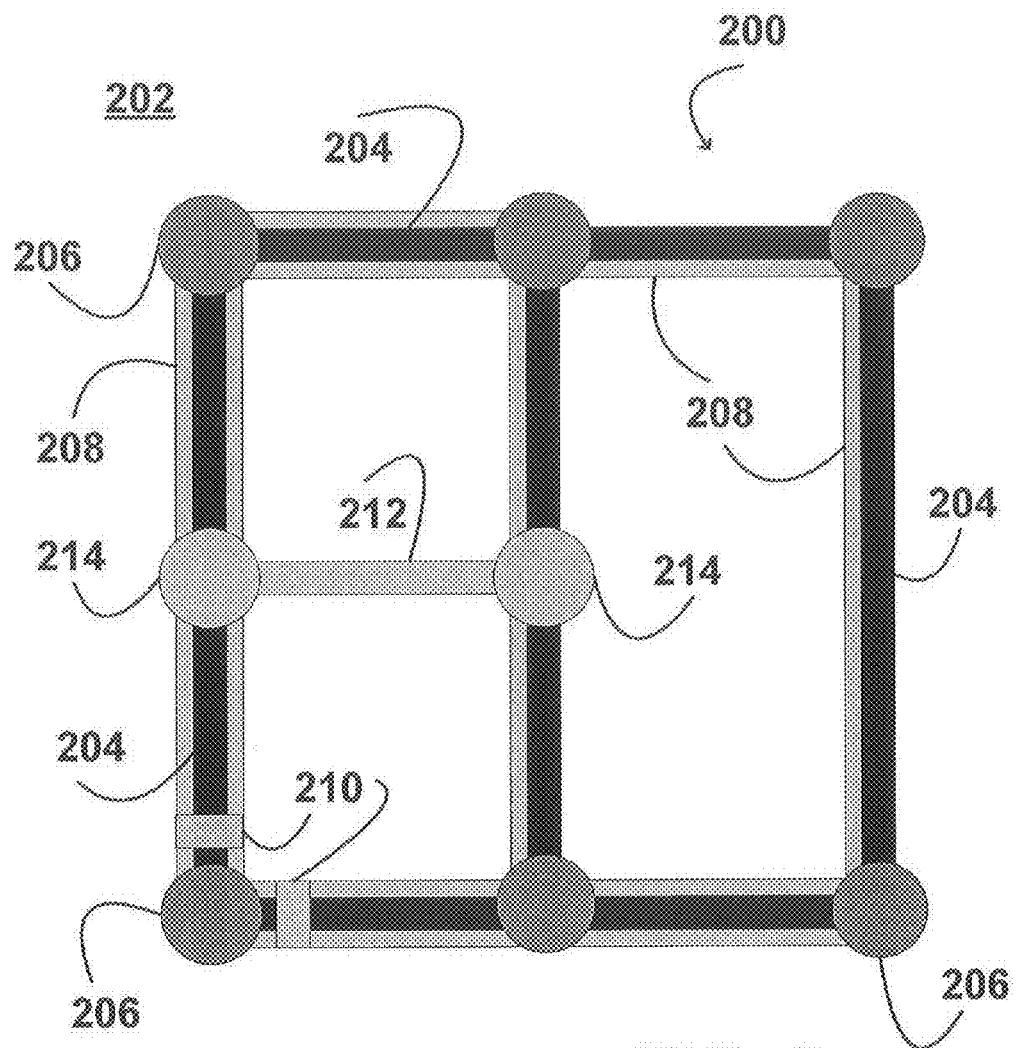
FIG. 2 shows a map of a geographic region.

In order to provide navigation-related features and functions to the end user, the navigation system 100 uses the geographic database 116. The geographic database 116 includes information about one or more geographic regions. FIG. 2 illustrates a map 200 of a portion of a geographic region 202. The geographic region 202 may correspond to a metropolitan or rural area, a state, a country, or combinations thereof, or any other area. Located in the geographic region 202 are physical geographic features, such as roads, points of interest (including businesses, municipal facilities, etc.), lakes, rivers, railroads, municipalities, etc.

The map 200 illustrates part of a road network in the geographic region 202. The road network includes, among other things, roads and intersections located in the geographic region 202. Each road in the geographic region 202 is composed of one or more road segments 204. A road segment 204 represents a portion of the road. Each road segment 204 is shown to have associated with it two nodes 206; one node represents the point at one end of the road segment and the other node represents the point at the other end of the road segment. The node 206 at either end of a road segment 204 may correspond to a location at which the road meets another road, i.e., an intersection, or where the road dead-ends.

As shown in FIG. 2, the geographic region 202 also includes sidewalks 208. A sidewalk 208 is a paved walkway along the side of the road segments 204. Sidewalks may exist on the right and/or left side and/or middle of a road segment 204. Similar to the road segments, the points at the end of sidewalk 208 are the nodes 206 associated with the respective road segment 204. Sidewalks allow pedestrian traffic but do not allow vehicle traffic. Accordingly, pedestrians may safely walk on the sidewalks 208 without having to interact with vehicles that travel the road segments 204. Additionally, crosswalks 210 connect the sidewalk located on the left side of the road segment to the sidewalk on the right side of the road segment. The areas spanned by adjacent road segments to a node are called corners. The crosswalk is a link between two neighbor corners of a node. The crosswalk, typically marked with paint on the pavement, provides a path for the pedestrian to cross the road.

In addition to traveling on sidewalks and crosswalks, pedestrians also travel on pedestrian links. Pedestrian links are sometimes referred to as virtual links. Vehicles that travel the road segments are not allowed to travel on the pedestrian links. Pedestrian links include pedestrian bridges, pedestrian tunnels, stairs, pedestrian paths including paved and unpaved paths through parks and plazas and other pedestrian areas. Referring to FIG. 2, a pedestrian link 212 connects to a pair of road segments 204 with sidewalks 208. A pair of pedestrian nodes 214 defines endpoints or anchor-points of the pedestrian link 212. For this example, the pedestrian link is a pedestrian zone that passes through a city business district that does not allow vehicle traffic.

Figure 3:
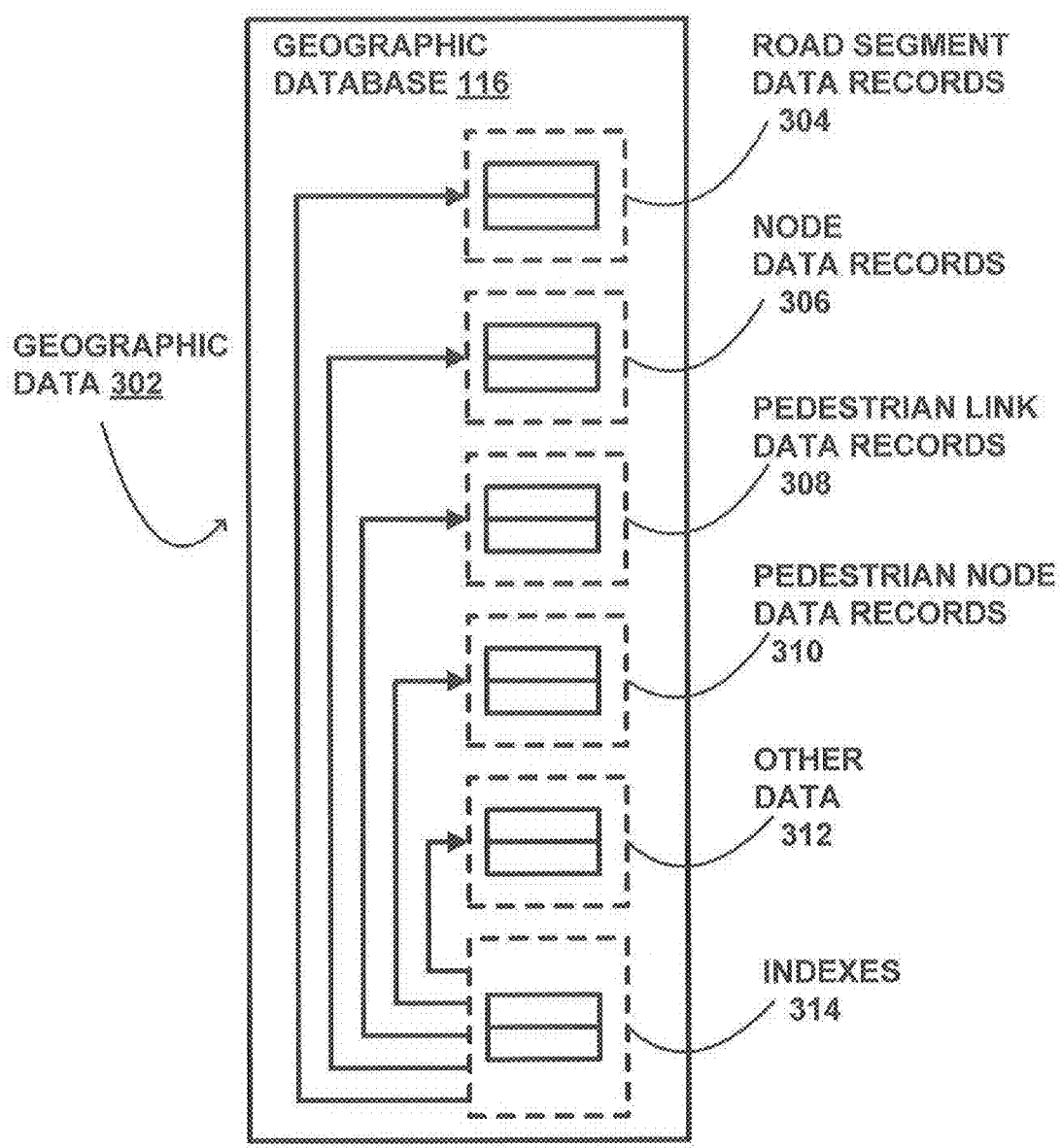
FIG. 3 is a block diagram of a geographic database included in the navigation system depicted in FIG. 1, according to an exemplary embodiment.

Referring to FIG. 3, the geographic database 116 contains data 302 that represents some of the physical geographic features in the geographic region 202 depicted in FIG. 2. The data 302 contained in the geographic database 116 includes data that represent the road network for travel by vehicles and the pedestrian network for travel by pedestrians. The data contained in the geographic database 116 may also include data that represent a public transit network in the geographic region. In the embodiment of FIG. 3, the geographic database 116 that represents the geographic region 202 contains at least one road segment database record 304 (also referred to as "entity" or "entry") for each road segment 204 in the geographic region 202. The geographic database 116 that represents the geographic region 202 also includes a node data record 306 (or "entity" or "entry") for each node 212 in the geographic region 202. The geographic database 116 also contains pedestrian link database records 306 (also referred to as "entity" or "entry") and pedestrian node data records 310 (or "entity" or "entry"). The terms "nodes" and "segments" and "links" represent only one terminology for describing these physical geographic features, and other terminology for describing these features is intended to be encompassed within the scope of these concepts.

The geographic database 116 may also include other kinds of data 312. The other kinds of data 312 may represent other kinds of geographic features or anything else. The other kinds of data may include point of interest data. For example, the point of interest data may include point of interest records comprising a type (e.g., the type of point of interest, such as restaurant, hotel, city hall, police station, historical marker, ATM, golf course, etc.), location of the point of interest, a phone number, hours of operation, etc. The geographic database 116 also includes indexes 314. The indexes 314 may include various types of indexes that relate the different types of data to each other or that relate to other aspects of the data contained in the geographic database 116. For example, the indexes 314 may relate the nodes in the node data records 306 with the end points of a road segment in the road segment data records 304. As another example, the indexes 314 may relate point of interest data in the other data records 312 with a road segment in the segment data records 304.

Figure 4:
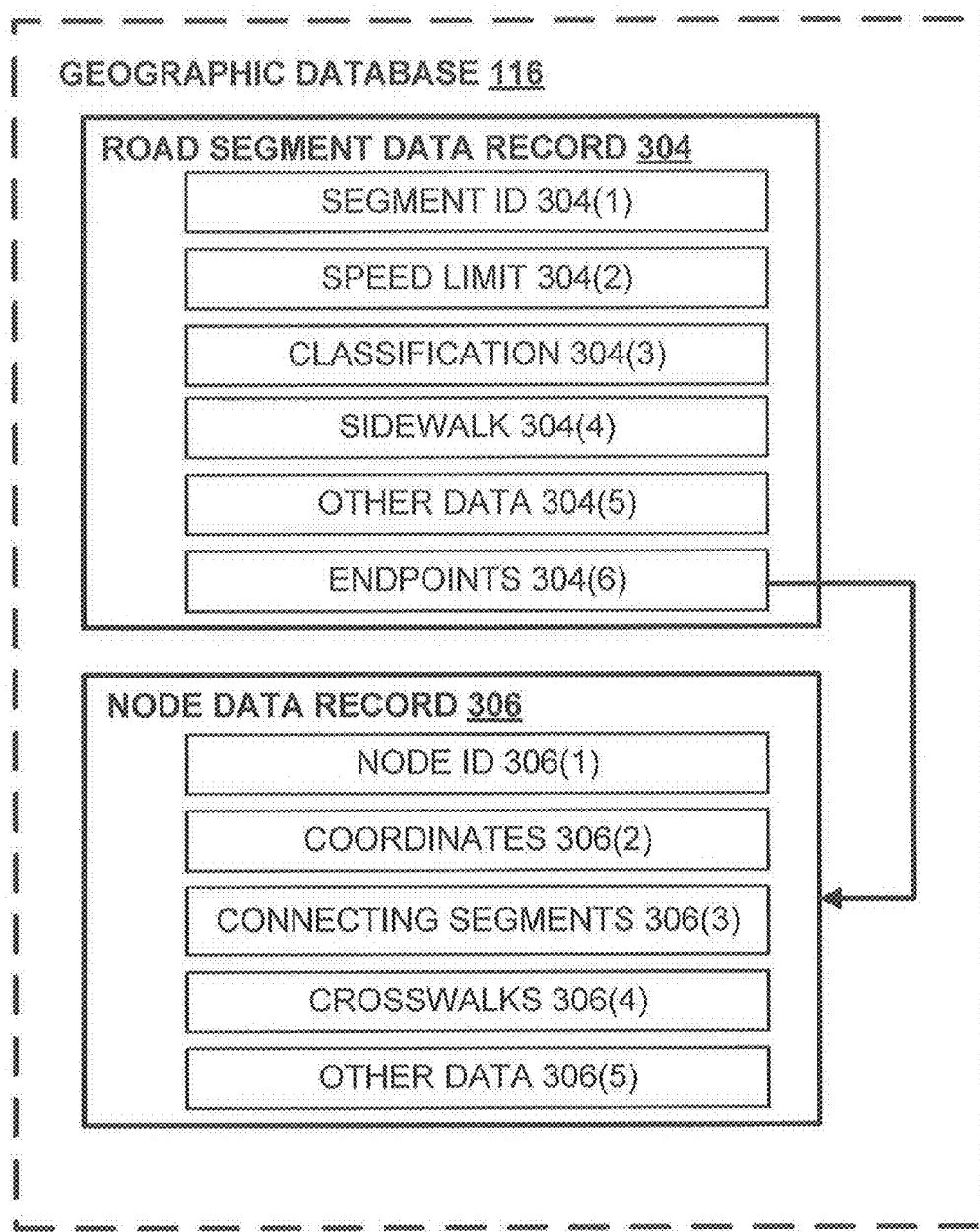
FIG. 4 is a block diagram of components of data records contained in the geographic database depicted in FIG. 3, according to an exemplary embodiment.

FIG. 4 shows some of the components of a road segment data record 304 contained in the geographic database 116. The road segment data record 304 includes a segment ID 304(1) by which the data record can be identified in the geographic database 116. Each road segment data record 304 has associated with it information (such as "attributes", "fields", etc.) that describes features of the represented road segment. The road segment data record 304 may include data 304(2) that indicate a speed limit or speed category (i.e., the maximum permitted vehicular speed of travel) on the represented road segment. The road segment data record 304 may also include data 304(3) that indicate a classification such as a rank of a road segment that may correspond to its functional class. For example, road segments having a rank of "4" may include high volume, controlled access roads, such as expressways and freeways. Road segments having a rank of "3" may be high volume roads with few speed changes, but are not necessarily controlled access roads. The lower ranked roads handle corresponding lower volumes and generally have more speed changes or slower speeds. Road segments having a rank of "0" can handle the lowest volumes, including side streets and alleyways.

The road segment data record also includes data 304(4) that indicate whether a sidewalk is associated with the road segment. The data indicating the sidewalk indicates whether a left sidewalk exist, whether a right sidewalk exists and whether a median sidewalk exists. The data may further indicate the type of pavement of the sidewalk as well as other attributes such as wheel chair accessible, children friendly, pet friendly, well-lighted area, poorly lighted area, busy area, non-busy area, noisy, peaceful, smelly/polluted, sheltered from rain, not sheltered from rain, no bikes allowed, tree lined, paved area, unpaved area, grassy area, gravel area, dirt area, muddy when wet area, hilly, steps, rough terrain, grade, and any other attribute information for the sidewalk.

The road segment data record 304 may also include or be associated with other data 304(5) that refer to various other attributes of the represented road segment. The various attributes associated with a road segment may be included in a single road segment record, or may be included in more than one type of record which cross-references to each other. For example, the road segment data record 304 may include data identifying what turn restrictions exist at each of the nodes which correspond to intersections at the ends of the road portion represented by the road segment, the name or names by which the represented road segment is known, the length of the road segment, the grade of the road segment, the street address ranges along the represented road segment, the permitted direction of vehicular travel on the represented road segment, whether the represented road segment is part of a controlled access road (such as an expressway), a ramp to a controlled access road, a bridge, a tunnel, a toll road, a ferry, and so on.

The road segment data record 304 may further include or be associated with other data 304(5) that are useful for providing route guidance. For example, the road segment data record 304 may be associated with data representing landmarks or readily visually identifiable features that the end user may see from the road segment or associated sidewalks. Additionally, the road segment data record 304 may be associated with data providing photographic images or video of the road segment and/or associated sidewalks. The photographic images or video may provide a view point from a vehicle traveling on the road segment or a view point from a pedestrian traveling on the associated sidewalk. The photographic images or video may provide an approximate 360° horizontal and 290° vertical panoramic street level views or other views.

The road segment data record 304 also includes data 304(6) identifying the endpoints of the road segment and the location (e.g., the latitude and longitude) of the endpoints. In one embodiment, the endpoint data 304(6) references node data records 306 defined for the nodes corresponding to the endpoints of the represented road segment. By convention, each road segment is considered to have a "left" endpoint and a "right" endpoint. The left endpoint may be the node having greater longitudinal coordinates, or in the case in which the longitudinal coordinates are the same, the node having the lesser latitude. Of course, which node is defined as the left or right endpoints can be alternatively defined.

Each node data record 306 includes a node identifier 306(1) by which the record can be identified in the geographic database 116. The node data record 306 also includes data 306(2) data identifying the geographic coordinates (e.g., the latitude, longitude, and optionally altitude) of the represented node.

The node data record 306 also includes data 306(3) identifying road segments that connect to the node to form an intersection. For example, a node identified by a node ID 306(1) may represent an intersection of two roads. At the intersection, each of the two roads may be represented by two road segments (located on opposite sides of the center of the intersection) each having an endpoint at the node. In this example of a standard four-way intersection, the connecting segment data 306(3) includes four segments IDs 304(1) identifying the four road segments that connect to the node to form the intersection.

The node data record 204 also includes crosswalk data 306(4). The crosswalk data 204(4) includes data that indicates a type of crosswalk. The crosswalk type may be based on crosswalk markings located on the road. The type of crosswalk markings used varies from country to country and from city to city within a country. Additionally, the crosswalk type may be based on the presence of a pedestrian tunnel or bridge. A crosswalk type may also be based on the presence of crossing lights or signs. The crosswalk data may also include data that identifies presence of a cut-out of the curb or a ramp associated with the crosswalk. The crosswalk data 306(4) also includes data that identifies the two corners associated with a crosswalk. An intersection may be represented in the geographic database 116 as a node located at approximately the center of the intersection and road segments having endpoints associated with the node. For example, an intersection of two roads is represented in the geographic database 116 as a node that corresponds to an endpoint of four road segments.

The corner data includes a corner label for each of the two corners connected by the crosswalk. Preferably, the corner label identifies the corners of an intersection in a clockwise or counterclockwise manner around the node that represents the intersection in the geographic database 116. The corner label is associated with one of the connecting segments 306(3). For example, a corner label representing a first corner of an intersection is located clockwise from a first connecting segment. Using this ordering, each corner can be represented by a single segment and a crosswalk between two corners can be represented using two segments, one for each corner. Because of the bidirectional nature of pedestrian crosswalks, the order of the corners in a crossing is not important.

The node data record 306 may also include other data 306(5) that refer to various other attributes of the nodes. The node data record 306 may further include or be associated with other data 306(5) that are useful for providing route guidance. For example, the node data record 306 may be associated with data representing landmarks or readily visually identifiable features that the end user may see from the intersections or associated crosswalks. Additionally, the node data record 306 may be associated with data providing photographic images or video of the intersection and/or associated crosswalks. The photographic images or video may provide a view point from a vehicle traveling through the intersection or a view point from a pedestrian traveling over the associated crosswalk. The photographic images or video may provide an approximate 360° horizontal and 290° vertical panoramic street level views or other views.

Figure 5:
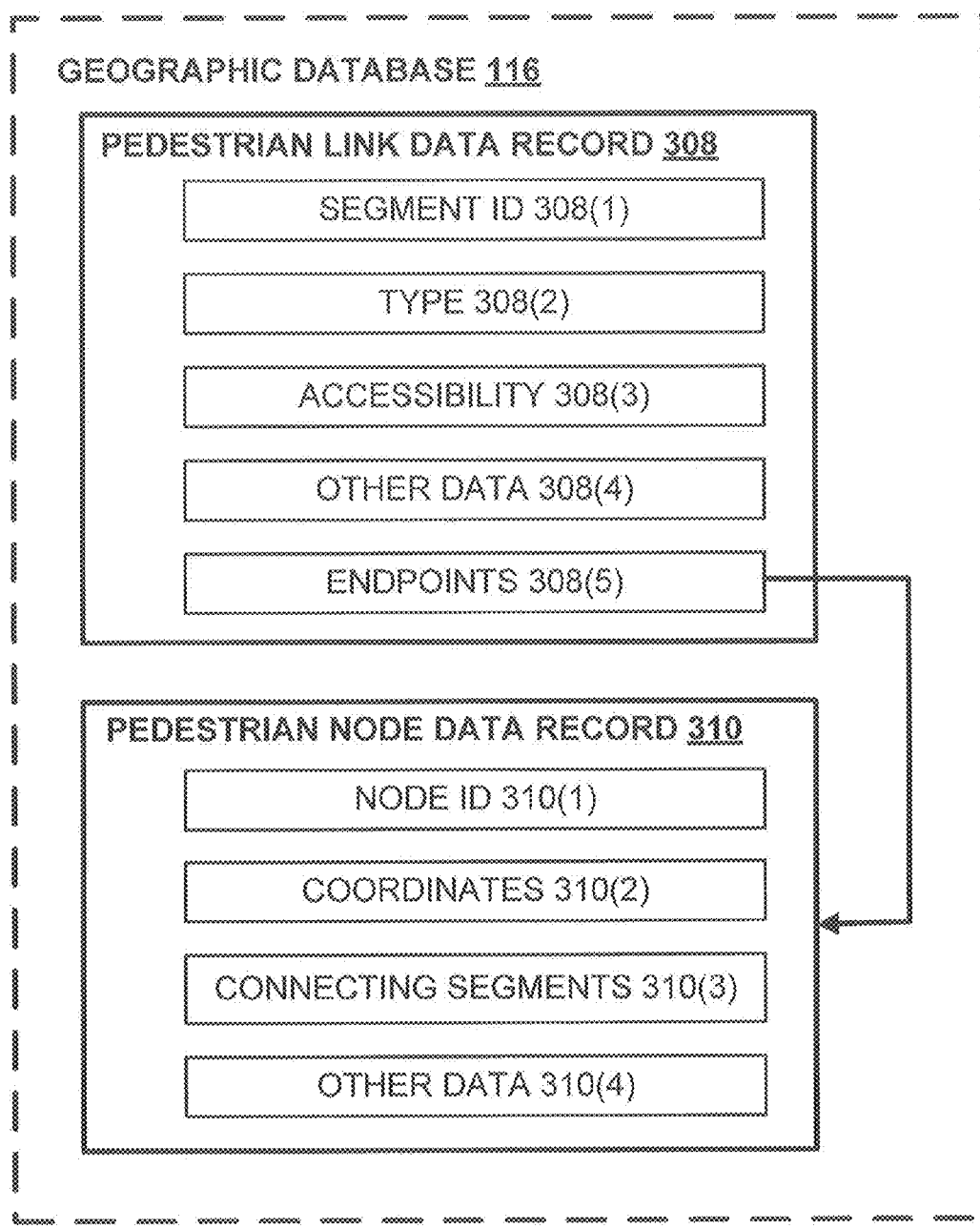
FIG. 5 is a block diagram of components of data records contained in the geographic database depicted in FIG. 3, according to an exemplary embodiment.

FIG. 5 shows some of the components of a pedestrian link data record 308 contained in the geographic database 116. The pedestrian link data record 308 includes a segment ID 308(1) by which the data record can be identified in the geographic database 116. Each pedestrian link data record 308 has associated with it information (such as "attributes", "fields", etc.) that describes features of the represented pedestrian link. The pedestrian link data record 308 may include data 308(2) that indicate a type of pedestrian link. The type of pedestrian link data may indicate a pedestrian bridge, pedestrian tunnel, stairs, escalator, elevator, pedestrian paths including paved and unpaved paths through parks and plazas and other pedestrian areas. The pedestrian link data record 308 may also include data 308(3) that indicate an accessibility of the pedestrian link such as appropriate for travel by walking, wheel-chairs, child strollers, bicycles, and other modes of transportation.

The pedestrian link data record 308 may also include or be associated with other data 308(4) that refer to various other attributes of the represented pedestrian link. The various attributes associated with a pedestrian link may be included in a single record, or may be included in more than one type of record which cross-references to each other. For example, the pedestrian link data record 308 may include data identifying the type of pavement or non-pavement of the pedestrian link, such as asphalt, cobblestones, gravel, grass, dirt and so on. The pedestrian link data record 308 may include data identifying the area that the link passes through, such as a business zone, a shopping zone, a tourist zone, a scenic or park zone, residential zone, and so on. The pedestrian link data record may include further attribute data indicating children friendly, pet friendly, well-lighted area, poorly lighted area, tree-lined area, scenic views, busy area, non-busy area, high crime area, low crime area, noisy, peaceful, smelly/polluted, hilly, number of steps, rough terrain, grade, weather affects, such as sheltered from rain, not sheltered from rain, muddy when wet, sunny area, shaded area, and any other attribute information.

The pedestrian link data record 308 may further include or be associated with other data 308(5) that are useful for providing route guidance. For example, the pedestrian link data record 308 may be associated with data representing landmarks or readily visually identifiable features that the end user may see from the pedestrian link. Additionally, the pedestrian link data record 308 may be associated with data providing photographic images or video of the pedestrian link. The photographic images or video may provide a view point from a pedestrian traveling on the pedestrian link. The photographic images or video may provide an approximate 360° horizontal and 290° vertical panoramic street level views or other views.

The pedestrian link data record 308 also includes data 308(5) identifying the endpoints of the pedestrian link and the location (e.g., the latitude and longitude) of the endpoints. In one embodiment, the endpoint data 308(5) references pedestrian node data records 310 defined for the nodes corresponding to the endpoints of the represented pedestrian link. By convention, each pedestrian link is considered to have a "left" endpoint and a "right" endpoint. The left endpoint may be the node having greater longitudinal coordinates, or in the case in which the longitudinal coordinates are the same, the node having the lesser latitude. Of course, which node is defined as the left or right endpoints can be alternatively defined.

Each pedestrian node data record 310 includes a node identifier 310(1) by which the record can be identified in the geographic database 116. The pedestrian node data record 310 also includes data 310(2) data identifying the geographic coordinates (e.g., the latitude, longitude, and optionally altitude) of the represented node. The pedestrian node data record 310 also includes data 310(3) identifying pedestrian links and/or road segments that connect to the pedestrian node. For example, a node identified by a node ID 306(1) may represent an intersection of a pedestrian link and two roads road segments. In this example, the connecting segment data 310(3) includes two road segments IDs 304(1) and one pedestrian link ID 308(1).

The pedestrian node data record 310 may also include other data 310(4) that refer to various other attributes of the nodes. The pedestrian node data record 310 may further include or be associated with other data 310(4) that are useful for providing route guidance. For example, the pedestrian node data record 310 may be associated with data representing landmarks or readily visually identifiable features that the end user may see from the pedestrian node. Additionally, the pedestrian node data record 310 may be associated with data providing photographic images or video of the pedestrian node. The photographic images or video may provide a view point from a pedestrian traveling on the pedestrian link. The photographic images or video may provide an approximate 360° horizontal and 290° vertical panoramic street level views or other views.

III. Route Calculation for a Pedestrian

As discussed above in conjunction with FIG. 1, the navigation system 100 includes navigation application software programs 110 that provide the various navigation features and functions. In one embodiment, the navigation functions and features may include route calculation 124 for a pedestrian. The route calculation function 124 receives a request to calculate a route to a desired destination. The request may be in the form of an identification of a starting location and a desired destination location. The identification of these locations may include the geographic coordinates of these locations. The route calculation function may also be provided with other data or parameters, such as walking preferences. Given at least the identification of the starting location and the destination location, the route calculation function 124 determines one or more solution routes between the starting location and the destination location. A solution route is formed of a series of connected sidewalks associated with road segments and/or pedestrian links over which the pedestrian can travel from the starting location to the destination location.

Figure 6A:
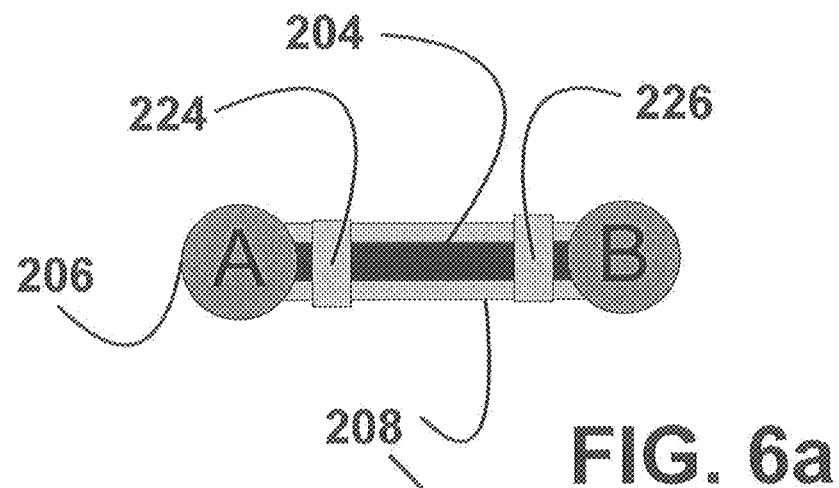
FIGS. 6a and 6b shows a portion of a map of a geographic region.
Figure 6B:
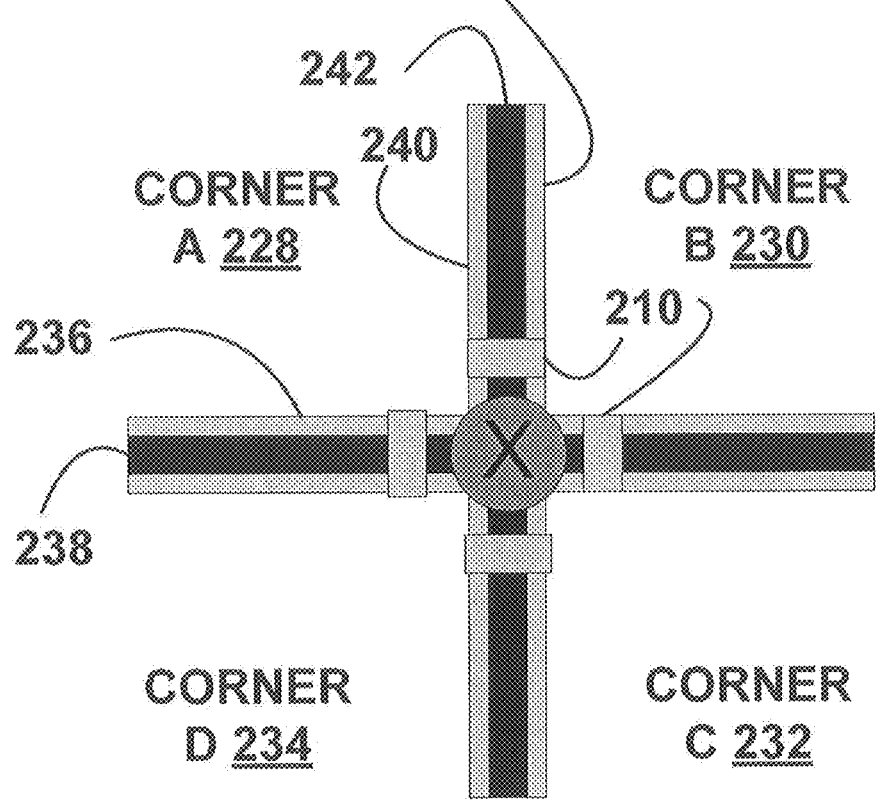

FIGS. 6a and 6b illustrate some orientation considerations for the pedestrian route because the pedestrian travels over pedestrian links and sidewalks associated with road segments. A road segment 204 has nodes 206 indicated as A and B. Sidewalks 208 exist on both sides of the road segment 204. From the perspective of a pedestrian located at node A and traveling with the direction of the road segment 204 toward node B, sidewalk 220 is a right sidewalk and sidewalk 222 is a left sidewalk. From the perspective of a pedestrian located at node B and traveling with the direction of the road segment 204 toward node A, sidewalk 222 is a right sidewalk and sidewalk 220 is a left sidewalk. Thus, the right sidewalk for travel from A to B is the same path as the left sidewalk for travel from B to A.

FIG. 6a shows a crosswalk 224 proximate node A and a crosswalk proximate node B. From the perspective of a pedestrian located at node A and traveling with the direction of the road segment 204 toward node B, crosswalk 224 is a start crosswalk and crosswalk 226 is a target crosswalk. From the perspective of a pedestrian located at node B and traveling with the direction of the road segment 204 toward node A, crosswalk 224 is a target crosswalk and crosswalk 226 is a start crosswalk. Thus, the start crosswalk for travel from A to B is the same path as the target crosswalk for travel from B to A.

FIG. 6b shows a node X with four connecting road segments 204 each having crosswalks 210 connecting respective right and left sidewalks 208. The four connecting road segments 204 form four corners: Corner A 228, Corner B 230, Corner C 232, and Corner D 234. At each corner, a pair of sidewalks 208 meets at the node X. From the perspective of a pedestrian located at Corner A of node X, a starting point of right sidewalk 236 of road segment 238 is also a starting point of left sidewalk 240 of road segment 242. From the perspective of a pedestrian traveling on sidewalk 236 to target node X, the target location of sidewalk 236 at node X is also the start location of sidewalk 240.

Figure 7:
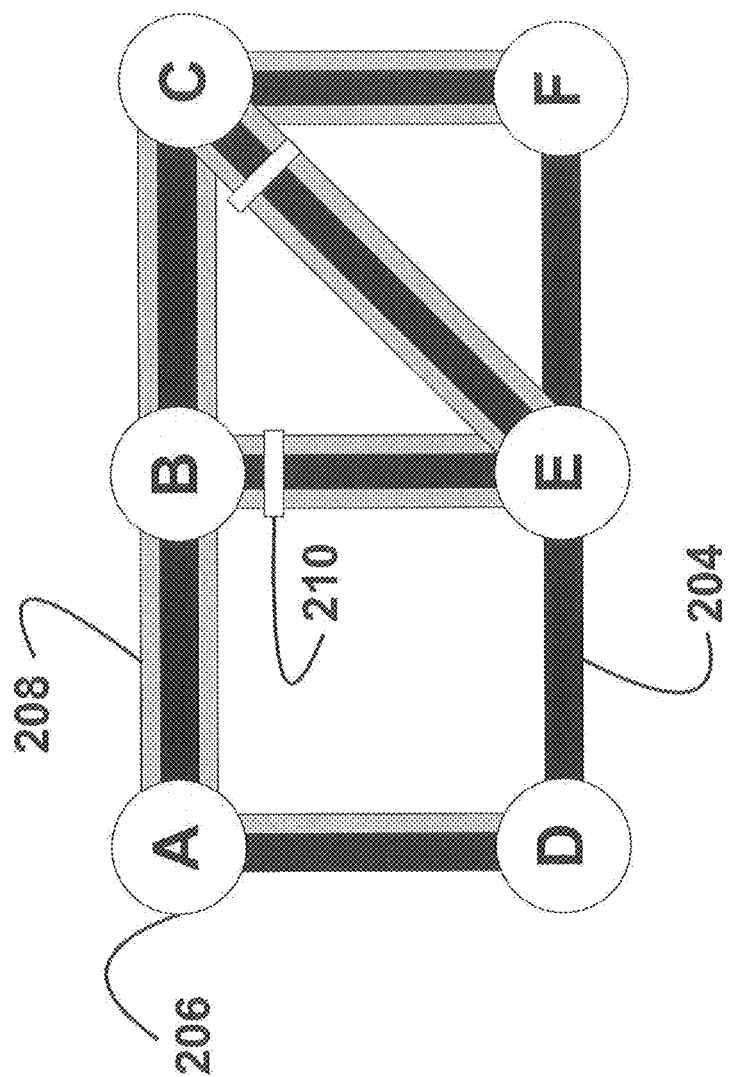
FIG. 7 shows a portion of a map of a geographic region.

In one embodiment of the present invention, route calculation function 124 uses a separate collection or subset of the geographic database 116. FIG. 7 illustrates a portion of the geographic region 202 that includes road segments 204, nodes 206 (labeled A, B, C, D, E, F for convenience), sidewalks 208 and crosswalks 210. FIG. 8 illustrates the subset of the geographic database representing the portion of the geographic region 202 shown in FIG. 7. The subset of the geographic database shown in FIG. 8 is used by the route calculation function for determining a pedestrian route according to one embodiment of the present invention. For convenience, the subset of the geographic database shown in FIG. 8 is referred to as pedestrian maneuver table 350. The pedestrian maneuver table 350 contains entries that represent paths appropriate for travel by pedestrians. A single pedestrian maneuver table 350 may be used to represent the pedestrian paths for a geographic region or several tables may be used. The pedestrian maneuver table 350 represents pedestrian paths including pedestrian links and road segments with sidewalks. Each path is represented in the pedestrian maneuver table 350 for a single travel direction. For example, the path from travel from node A to node B is represented as a table entry, and the same path for travel from node B to node A is also represented as another table entry.

As shown in FIG. 8, the pedestrian maneuver table 305 includes a unique identification ("IDX") 352 that identifies the pedestrian link. The pedestrian maneuver table 350 also includes a Start Node column 354 and a Target Node column 356. The Start Node column 354 and Target Node column 356 each includes a unique identification of a node. For a pedestrian traveling on the path from node A to node B, node A is considered to be the start node and node B is consider to be the target node.

The pedestrian maneuver table 350 also includes a Left Sidewalk column 358 that indicates the presence of a sidewalk on the left side of the road segment for a pedestrian traveling from the start node to the target node. The pedestrian maneuver table 350 further includes a Right Sidewalk column 360 that indicates the presence of a sidewalk on the right side of the road segment for a pedestrian traveling from the start node to the target node. The pedestrian maneuver table 350 further includes a Start Crosswalk column 362 that indicates the presence of a crosswalk crossing the road segment proximate the start node. The pedestrian maneuver table 350 further includes a Target Crosswalk column 364 that indicates the presence of a crosswalk crossing the road segment proximate the target node. The pedestrian maneuver table 350 further includes a Left Node column 366 that indicates the node to the far left of the target node and a Right Node column 368 that indicates the node to the far right of the target node.

The pedestrian maneuver table 350 may include additional columns with various attributes for the pedestrian paths including length of the path, presence of traffic signals controlling the intersection and/or crosswalk, presence of stop sign or other signage at the start and/or target node, grade and/or curvature of the segment, speed limit of the road segment associated with the sidewalk and crosswalk, classification of the road segment associated with the sidewalk and crosswalk, traffic level on the road segment associated with the sidewalk and crosswalk, type of pavement of the sidewalk, pedestrian-only area, wheel chair accessible, children friendly, pet friendly, well-lighted area, poorly lighted area, busy area, non-busy area, noisy, peaceful, smelly/polluted, sheltered from rain, not sheltered from rain, no bikes allowed, tree lined, paved area, unpaved area, grassy area, gravel area, dirt area, muddy when wet area, icy and snow covered in winter, hilly, steps, rough terrain, grade or any other attribute.

When the route calculation function 124 calculates a route, it accesses the geographic database 116 and obtains the pedestrian maneuver table 350 and/or other data. The route calculation function 124 uses the information in the table 350 and geographic database 116 to attempt to determine at least one valid solution route for the pedestrian to travel. The route calculation function 124 may use an A-star algorithm, a Dijkstra method, or search, and/or other means or algorithms in determining solution routes. Methods for route calculation are disclosed in U.S. Pat. No. 6,192,314, the entire disclosure of which is incorporated by reference herein. (The methods disclosed in the aforementioned patent represent only some of the ways that routes can be calculated and the claimed subject matter herein is not limited to any particular method of route calculation. Any suitable route calculation method now known or developed in the future may be employed.)

Figure 9:
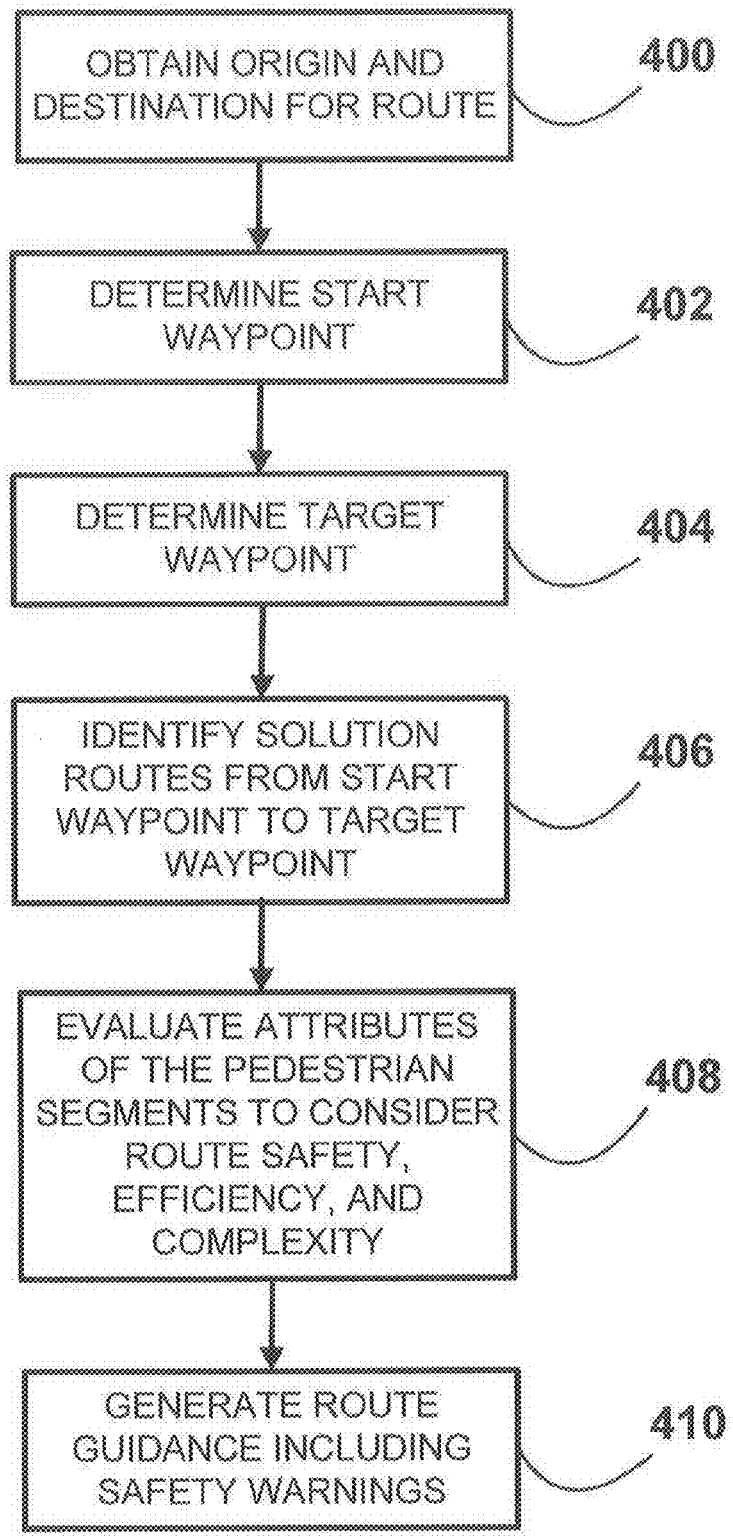
FIG. 9 is a flow chart for determining a pedestrian route.

FIG. 9 is a flow chart for determining a pedestrian route by the route calculation function, according to an exemplary embodiment. The steps of FIG. 9 will be illustrated using the pedestrian paths in the geographic regions shown in FIG. 10. At step 400, the route calculation function obtains a request for a pedestrian route and obtains an origin and a desired destination for the route. In one embodiment, the pedestrian enters his or her desired destination using the user interface 114 of the navigation system 100. The desired destination may be entered as a street address, business name, and/or point of interest name as well as selected from point of interest categories. Using the positioning system 112, the positioning function 130 determines the origin; alternatively, the pedestrian enters his or her origin.

Figure 10:
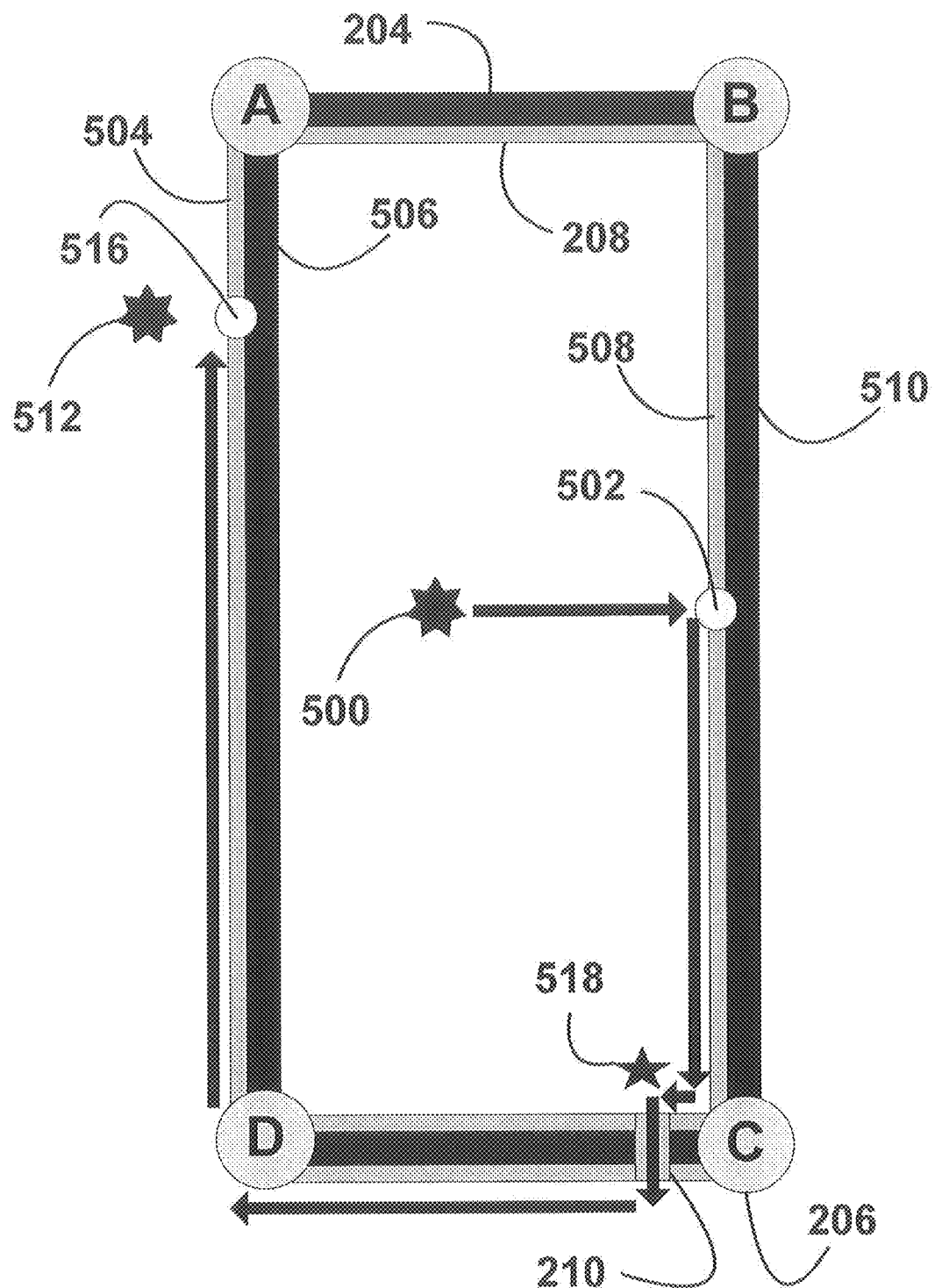
FIG. 10 shows a portion of a map with a pedestrian route.

At step 402, the route calculation function 124 determines an origin waypoint given the origin. The origin may be provided to the route calculation function 124 as latitude and longitude coordinates that are map matched to the road and pedestrian path network represented by the geographic database. The origin may also be provided as a street address, point of interest or in any other manner. Referring to FIG. 10, the origin 500 is located away from pedestrian paths represented by the geographic database 116 and off of the road network represented by the geographic database 116. The origin waypoint 502 is a location on one of the pedestrian paths at which the pedestrian connects to one of the pedestrian paths from the origin 500. For the example shown in FIG. 10, the origin 500 is located in a parking lot away from any pedestrian paths represented by the geographic database 116 and off of the road network represented by the geographic database 116. For the pedestrian located at origin 500, he or she will travel to join one of the pedestrian paths, such as a sidewalk 508.

In one embodiment, safety considerations dictate the selection of the origin waypoint 502. The origin waypoint 502 is a point on one of the pedestrian paths that is the closest to the origin without requiring crossing one of the road segments. As shown in FIG. 10, sidewalk 504 is geometrically the closest to the origin 500, but the road segment 506 does not have a sidewalk on the side closest to the origin 500. Thus, selecting the origin waypoint on the sidewalk 504 would require the pedestrian to cross the road segment 506 (jaywalk) which is dangerous and prohibited in some jurisdictions. Because travel from the origin 500 directly to sidewalk 504 by crossing road segment 506 is dangerous and prohibited, the route calculation function 124 chooses point 502 on sidewalk 508 of road segment 510 as the origin waypoint. Point 502 is the closest point on a sidewalk to the origin 500 without requiring crossing one of the road segments.

In another embodiment, the route calculation function 124 considers the location of the destination and a shortest travel distance as well as safety considerations when determining the origin waypoint. For the example shown in FIG. 10, the destination 512 requires a route that uses the crosswalk associated with sidewalk 514. In this case, although sidewalk 514 is farther away than sidewalk 508, the origin waypoint is chosen on sidewalk 514 to provide a shorter pedestrian route than the origin waypoint on sidewalk 508 while still maintaining the safety consideration of one of the pedestrian paths without requiring crossing one of the road segments.

In another embodiment, the navigation system 100 provides an option for the safety considerations to be turned off by the user. In some situations, the pedestrian may find having to travel a greater distance to use sidewalks irritating and unnecessary. For example, if the pedestrian is located in a residential area where crossing the road segment without using a crosswalk offers minimal risk for being struck by a vehicle traveling on the road segment. Accordingly, the user may use a menu option via the user interface 114 to remove the safety consideration of using the origin waypoint on one of the pedestrian paths without crossing a road segment. In a further embodiment, the route calculation function 124 considers evaluates data from the geographic database 116 to determine whether crossing the road segment presents a significant safety risk. For example, the route calculation function 124 may determine, using attribute data representing the road segment, that the road segment is in a residential area, that the road segment is a local road with little traffic, that the road segment has a very low speed limit, such as 25 miles per hour and/or other information from the attribute data. In these cases, the route calculation function 124 selects the origin waypoint based on shortest distance to the closest one of the pedestrian paths regardless of crossing a road segment.

At step 404, the route calculation function 124 searches for a target waypoint given the destination in a manner similar to that described above for the origin waypoint. The destination may be provided to the route calculation function 124 as latitude and longitude coordinates, address, point of interest or in any other manner. Referring to FIG. 10, the destination 512 is proximate the sidewalk 504 without having to cross the road segment 506. Accordingly, the destination waypoint 516 is located at a point on the sidewalk 504 that is geometrically the shortest distance to the destination 512.

At step 406, the route calculation function 124 searches for at least one solution route for the pedestrian to travel from the origin waypoint to the target waypoint. The solution pedestrian route comprises a series of pedestrian paths, including sidewalks and pedestrian links, as well as crosswalks connecting sidewalks separated by a road segment. The solution pedestrian route does not allow the route that crosses a road segment without a crosswalk. Referring to FIG. 10, only one solution pedestrian route 518 exists between the origin waypoint 500 and the target waypoint 516. The solution pedestrian route 518 comprises the right sidewalk of the road segment from node B to node C which meets the right sidewalk of the road segment from node C to node D. The route 518 then comprises the crosswalk 210 and the left sidewalk of the road segment from node C to node D. The left sidewalk from node C to node D meets the left sidewalk of the road segment from node D to node A, and the route 518 follows this sidewalk to the target waypoint 516.

Referring to FIG. 10, a different route comprising the left sidewalk from node C to node B, the left sidewalk from node B to node A and the right sidewalk from node A to node D is not a valid pedestrian route. Because this route does not provide a crosswalk, or other pedestrian link, such as a pedestrian bridge or tunnel, to cross the road segment from node A to node D, the route calculation function 124 does not provide this route as a solution pedestrian route. In an alternative embodiment, the route calculation function 124 may identify a solution route that crosses a road segment without a crosswalk. In this embodiment, the route calculation function 124 may determine, using attribute data representing the road segment, that the road segment is located in a residential area, the road segment is a local road with little traffic, the road segment has a very low speed limit, such as 25 miles per hour and/or other information from the attribute data. Furthermore, traffic information regarding the volume of traffic on the road segment may be considered to determine whether crossing the road segment without a crosswalk is a minor safety risk. In these cases, the route calculation function 124 provides a route comprising the left sidewalk from node C to node B, the left sidewalk from node B to node A and the right sidewalk from node A to node D to the destination waypoint 512.

At step 408 of FIG. 9, when the route calculation function 124 identifies more than one solution pedestrian route, the route calculation function evaluates the attributes of the pedestrian segments comprising the different routes to consider route safety, route efficiency and route complexity. The route calculation function selects the route that optimizes the route safety and/or route efficiency and/or minimizes route complexity. When evaluating the solution routes, the route calculation function applies weights to pedestrian paths (segments) and/or nodes that form the navigable routes to determine a cost of travel of each solution route.

The cost of travel is a value that indicates the cumulative total cost to travel a route from the origin waypoint to the target waypoint. The cost refers to the measurable value that is being minimized during a search relative to the origin waypoint. The cost may be configurable to provide a route that minimizes safety risks, minimizes route distance, minimizes travel time, minimizes route complexity and so on. For example, it is desirable to find the quickest route, and therefore time is the cost item being minimized. If the shortest route is desired, distance is the cost item being minimized. Other kinds of cost items may be selected, including custom cost functions that incorporate combinations of various factors. The following paragraphs describe additional factors or attributes to consider when computing cost values of the solution routes. In one embodiment, the cost value is developed as the route is being calculated by adding the costs of the pedestrian paths (and/or nodes) that are added to a solution route from the origin waypoint to the target waypoint.

For safety considerations, the route calculation function 124 provides cost items that favor pedestrian-friendly areas that the pedestrian may travel through without interacting with vehicles over sidewalks and crosswalks. Pedestrian-friendly areas include pedestrian only zones, such as parks, designated no-vehicle zones, plazas, pedestrian tunnels and pedestrian bridges. The route calculation function 124 uses attribute data from the geographic database to determine whether one of the pedestrian paths is located in a pedestrian only zone. In one embodiment, the route calculation function 124 accesses the geographic database 116 to obtain data that indicate the type 308(2) of the pedestrian path from the pedestrian link data record 308.

For safety considerations, the route calculation function 124 provides cost items that disfavor crossing roads by a crosswalk. When the pedestrian crosses a road on a crosswalk, the pedestrian faces the dangerous possibility that vehicles on the road do not observe the pedestrian and may strike the pedestrian. Accordingly, the route calculation function 124 favors a route that reduces this safety risk. For example, a pedestrian bridge or pedestrian tunnel that crosses a street is favored over a crosswalk. When crossing a road is a necessary component of the route, the route calculation function 124 uses attribute data from the geographic database to select crosswalks that have features that help lessen the risk of crossing the road.

In one embodiment, the route calculation function 124 uses data from the node data record of the crosswalk that indicates whether the crosswalk is associated with an intersection that is controlled by traffic signals with a pedestrian crossing signal that shows the pedestrian when to cross the street and when not to cross the street. In another embodiment, the route calculation function 124 uses data from the node data record 306 of the crosswalk that indicates what type of traffic control signal or sign is associated with the intersection. The route calculation function 124 uses cost items that favor crosswalks associated with a traffic signal that shows the pedestrian when to cross the street and when to stop over crosswalks that do not include such a signal or that include stop signs. The route calculation function 124 uses weights that favor crosswalks associated with all-way stop sign arrangement over crosswalks that do not include such a signal. The route calculation function 124 uses weights that favor crosswalks associated with a stop sign controlling the traffic on the street that the pedestrian must cross over crosswalks that do not include such a signal.

In another embodiment, the route calculation function 124 uses data indicating the connecting segments 306(3) at the intersection to determine the type of intersection associated with the crosswalk. The route calculation function 124 uses weights that favor crosswalks associated with intersections having fewer connecting segments over those with more connecting segments because for more complex intersections pedestrian may not carefully check traffic in every possible direction before crossing. In a further embodiment, the route calculation function 124 uses data representing the slope and/or curvature of the connecting segments 306(3) at the intersection to determine whether the intersection as a pedestrian blackspot. For example, a blackspot is a portion of the connecting road segment that is not visible to the pedestrian because the portion of the road segment is obscured due to a hill or curve. The route calculation function 124 uses cost items that favor crosswalks associated with intersections having no or fewer blackspots over those with more blackspots because vehicles may not see pedestrians at intersections having blackspots.

For further safety considerations, the route calculation function 124 provides cost items that disfavor sidewalks and crosswalks associated with road segments having a high volume of vehicles and vehicles that travel at high speeds. In one embodiment, the route calculation function 124 uses data indicating the classification 304(3) such the function class of the road segment. The route calculation function 124 uses weights that favor sidewalks and crosswalks associated with road segments having a lower rank, such as rank of "0" and "1" over sidewalks and crosswalks associated with road segments of higher rank. In another embodiment, the route calculation function 124 uses data indicating the speed limit or speed category 304(2) of the road segment associated with the sidewalk or crosswalk. The route calculation function 124 uses weights that favor sidewalks and crosswalks associated with road segments having a lower speed over sidewalks and crosswalks associated with road segments of higher speed.

In a further embodiment, the route calculation function 124 uses real time traffic data and cost items that favor sidewalks and crosswalks associated with road segments having less vehicle traffic over sidewalks and crosswalks associated with road segments with higher traffic. Similarly, the route calculation function 124 may also use historic traffic data. In another embodiment, the route calculation function 124 uses data indicating construction zones and avoids sidewalks and crosswalks in the construction zones. In another embodiment, the route calculation function 124 uses real time weather data and cost items that favor pedestrian paths that are less affected by weather, such as rain, snow and ice. Similarly, the route calculation function 124 may also use weather forecast data.

In addition to safety considerations based on avoiding interaction with vehicles, the route calculation function 124 also considers the personal safety of the pedestrian and avoids high crime and dangerous areas. In one embodiment, the route calculation function 124 uses police crime data indicating the locations of crimes. The route calculation function 124 uses cost items that favor sidewalks and pedestrian links having lower crime over sidewalks and pedestrian links with higher crime. In another embodiment, the route calculation function 124 uses data representing points of interest such as the type of point of interest. The route calculation function 124 uses cost items that favor sidewalks and pedestrian links that pass by pedestrian friendly points of interest, such as cafes and restaurants over sidewalks and pedestrian links with adult-themed stores and bars.

In addition to safety considerations, the route calculation function 124 also designs the route to be efficient. The route calculation function 124 uses data representing the length of the road segments and favors a route with that minimizes the walking distance. The route calculation function 124 also considers the expected travel time of the route considering both the walking distance with average walking speed and likely waiting time to cross streets. In one embodiment, the route calculation function 124 uses data indicating the timing pattern or wait time for the traffic signal that control the right of way for the crosswalk to compute the expected travel time for crosswalks in the route. Additionally, the route calculation function 124 may use time estimates to cross roads for each function class of the roads; for example roads having a lower rank, such as rank of "0" and "1" have smaller wait times for crossing than roads of higher rank. Moreover, the route calculation function 124 may use adjust time estimates to cross roads based on real time and historic traffic information; for example, the wait time is increased by five seconds during high traffic periods. Furthermore, the route calculation function 124 may consider events and avoid sidewalks proximate those events; for example, events tend to cause crowds that increase the pedestrians travel time on the sidewalk.

Additionally, the route calculation function 124 also considers route complexity. In one embodiment, the route calculation function 123 avoids numerous turns and complex intersections because pedestrians may become confused on direction of travel. Additionally, the route calculation function 124 considers ease of following the route to provide routes that the pedestrian may be guided along while minimizing the likelihood that the pedestrian will become confused as to which sidewalks and/or pedestrian links to travel and turns to make. In one embodiment, the route calculation function 124 provides cost items that favor pedestrian links, sidewalks and crosswalks that are associated with data that are useful for providing route guidance. For example, the route calculation function 124 favors sidewalks, crosswalks and pedestrian links that have associated data representing landmarks or readily visually identifiable features that the end user may see from the pedestrian link. These landmarks and visible features may be referenced in route guidance messages to help the pedestrian follow the route. Additionally, the route calculation function 124 favors sidewalks, crosswalks and pedestrian links that have associated data providing photographic images or video of the respective sidewalks (or associated road segments), crosswalks (or associated intersections) and pedestrian links. The photographic images or video (with route highlights or guidance arrows overlaid) may be provided along with guidance messages to orientate the pedestrian and to help the pedestrian follow the route.

The route calculation function 124 provides an output. In one embodiment, the output of the route calculation function 124 is in the form of an ordered list identifying a plurality of identifications of the pedestrian links ("IDX") 302. The plurality of pedestrian link data entities represent the pedestrian paths that form the continuous navigable route between the origin and the destination that had been calculated by the route calculation function 124.

At step 410 of FIG. 9, the navigation system 100 provides route guidance comprising maneuvers and safety warnings to the pedestrian. The route guidance function 126 uses the output from the route calculation function 124 to provide maneuver instructions for the pedestrian to travel to the desired destination on the calculated route. The route guidance function 126 generates an output comprised of a series of maneuvers derived from the list of pedestrian links provided in the output of the route calculation function 124. The output of the route guidance application is provided to the pedestrian through a user interface 114 included on the computing platform 102. The output of the route guidance may be conveyed audibly through speech synthesis or on a visual display. Using data that indicate the pedestrian's current position, the route guidance function determines the appropriate times and locations at which to provide maneuvering instructions. The route guidance maneuvers instruct the pedestrian to turn in a specified direction at specified nodes connecting pedestrian links of the route. Methods for providing route guidance using geographic data are disclosed in U.S. Pat. No. 6,199,013, the entire disclosure of which is incorporated herein by reference. (The methods disclosed in the aforementioned patent represent only some of the ways that route guidance can be calculated and the claimed subject matter herein is not limited to any particular method of route guidance. Any suitable route guidance method now known or developed in the future may be employed.)

In addition to providing maneuvers for following the route, the route guidance function 126 also provides safety advisories or warnings as the pedestrian travels the route. Using data that indicate the pedestrian's current position, the route guidance function identifies the pedestrian link that the pedestrian is traveling on and evaluates the attribute data associated with the current pedestrian link or upcoming pedestrian link and/or node of the route or other data (real-time traffic, weather) to generate safety advisories. For example the example shown in FIG. 10, if the pedestrian is located at location 518 about to cross a crosswalk associated with a road segment that has vehicle traffic that will not stop at the intersection, the safety advisory is "Caution, vehicle traffic does not stop at the intersection." Similarly, if the pedestrian is about to cross a crosswalk associated with a road segment whose speed limit is 55 miles per hour, the safety advisory is "Caution, vehicle traffic is moving very fast." Likewise, if the pedestrian is about to cross a crosswalk associated with a road segment that has two-way traffic, the safety advisory is "Caution, two-way vehicle traffic." Moreover, if the pedestrian is about to cross a crosswalk associated with a road segment that has one-way traffic, the safety advisory is "Caution, vehicle traffic comes from your left." The safety advisories relate to the type of road segment being crossed, the type of intersection being crossed, traffic, weather, pedestrian link condition, pedestrian blackspots, criminal activity, and so on.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A computer implemented method of operating a navigation system to provide a pedestrian route, the method comprising:
   receiving an origin and a destination;
   determining, using a processor, a plurality of candidate solution routes each comprising a plurality of sidewalks and crosswalks that form a continuous navigable route between the origin and the destination, wherein the sidewalks are associated with road segments and motor vehicles are prohibited from traveling the sidewalks;
   receiving data indicative of a user selection option for safety consideration of crosswalks;
   performing, using the processor, a comparison of the plurality of candidate solution route based on the user selection for safety consideration of crosswalks,
   wherein when the user selection for safety consideration of crosswalks is turned on, a first candidate solution route from the origin to the destination having a first distance is selected, and when the user selection for safety consideration of crosswalks is turned off a second candidate solution route from the origin to the destination having a second distance is selected, wherein the first distance is greater than the second distance, and generating route guidance including a safety advisory.

2. The method of claim 1 wherein the comparison is further based on cost items that favor pedestrian friendly zones.

3. The method of claim 1 wherein the comparison is further based on cost items that favor crosswalks controlled by an associated traffic signal.

4. The method of claim 1 wherein the comparison is further based on cost items that favor crosswalks associated with an intersection having an all-way stop.

5. The method of claim 1 wherein the comparison is further based on cost items that disfavor crosswalks having pedestrian blackspots.

6. The method of claim 1 wherein comparison is further based on cost items that disfavor crosswalks that cross high speed roads.

7. The method of claim 1 wherein the safety advisory provides information regarding roads to be crossed.

8. The method of claim 1, wherein the comparison is based at least on part of analysis of data describing characteristics for the sidewalks in a pedestrian maneuver table.

9. The method of claim 1, wherein the comparison is further based on whether there is a curb cut-out or ramp.

10. A navigation system that provides a pedestrian route, the method comprising:
    a geographic database including a pedestrian maneuver table;
    a computer; and
    a route calculation program executed on the computer, the route calculation program configured to:
    receive an origin and a destination,
    identify a first solution route and a second solution route based on the origin and the destination, wherein the first solution route is longer than the second solution route,
    identify a user selection for safety consideration of crosswalks,
    compare the first solution route and the second solution route based on the user selection for safety consideration of crosswalks and at least one characteristic of a crosswalk in the second solution route, and
    select the first solution route based on the user selection for safety consideration of crosswalks even though the first solution route is longer than the second solution route.

11. The navigation system of claim 10,
    wherein the route guidance program determines maneuvers for following the first solution route and generates a safety advisory for the first solution route.

12. The navigation system of claim 10 wherein the route calculation program accesses the geographic database to obtain data representing a safety cost item associated with the first solution route.

13. The navigation system of claim 12 wherein the safety cost item minimizes pedestrian interaction with motor vehicles.

14. A computer implemented method of operating a navigation system to provide a pedestrian route, the method comprising:
    receiving a request for a route from an origin to a destination;
    receiving a user preference for safety consideration in pedestrian routing;
    identifying, using a processor, a plurality of pedestrian paths by accessing data representing the pedestrian paths to determine which of the plurality of pedestrian paths include crosswalks and types of intersections associated with the crosswalks;
    performing, using the processor, a comparison of the plurality of pedestrian paths based on the user preference, wherein:
    the processor selects a first route from the origin to the destination including fewer crosswalks or less complex intersections when the user preference for safety consideration is activated; and
    the processor selects a second route from the origin to the destination including more crosswalks or more complex intersections when the user preference for safety consideration is deactivated.

15. The method of claim 14 further comprising:
    providing guidance for the first route or the second route, the guidance including maneuver instructions and a safety advisory.

16. The method of claim 14 wherein the safety cost is determined using cost items that disfavor pedestrians interacting with motor vehicles.

17. The method of claim 14 wherein the route favors pedestrian paths that are associated with data representing landmarks along the pedestrian path or images of the pedestrian path from a geographic database.

18. The method of claim 14 wherein the provided route is optimized for travel efficiency.

19. The method of claim 14, wherein the comparison is based on a pedestrian maneuver table that includes first data indicative whether each of the plurality of pedestrian paths includes a crosswalk and second data indicative of whether each of the pedestrian paths includes a signal for the crosswalk.

20. The method of claim 14 wherein the first route is longer than the second route.

* * * * *